2,713,570

VINYL ACETOPHENONE-MALEIC ANHYDRIDE COPOLYMER

William O. Kenyon, George P. Waugh, and Cornelius C. Unruh, Rochester, N. Y., assignors to Eastman Kodak Company, Rochester, N. Y., a corporation of New Jersey No Drawing. Application September 13, 1951, Serial No. 246,519

1 Claim. (Cl. 260—63)

This invention relates to the preparation of acylated styrene compounds and copolymers thereof and particularly to the preparation of vinyl acetophenone and its copolymers.

The acylation of styrenes with long chain acyl halides has been described in the Ralston et al. U. S. Patent 2,197,709. However, no attempt was made to characterize the products by isolation and purification of the monomeric acylated styrene. Bachman et al., J. Org. Chem., 12, 108–120 (1947) attempted to acylate polystyrene and to pyrolyze the resulting product to isolate monomeric acetyl styrene but obtained only "complex mixtures" which were attributed to rearrangement of the product in the presence of the Friedel-Crafts catalyst. The distillates which were obtained "did not boil in the right range."

We have discovered that polystyrenes can be acylated with low molecular weight acyl halides to yield the corresponding acylated polystyrenes and that the monomeric acylated styrenes can be obtained therefrom by isolation of the acylated polystyrene from the reaction mixture and thermally decomposing the polymer under reduced pressure.

In general, our process is carried out by acylating a styrene homopolymer, for example, polystyrene, poly α-methylstyrene, m-methyl-, 2,5-dimethyl-, o-chloro-, m-chloro-, p-chloro, p-benzyl-, 3,4-dichloro-, 2,5-dichloro-, 3,4-dimethoxy-, m-tert. butyl-, o-methoxy, or p-phenoxy styrenes with an anhydride or acid halide in a solvent medium in the presence of a Friedel-Crafts catalyst. The acylating agents used include an anhydride such as acetic anhydride or an acid halide such as acetyl-, propionyl-, n-butyryl-, isobutyryl-, n-valeryl chlorides or bromides, chloroacetyl chloride, bromoacetyl bromide and benzoyl chloride. The aliphatic acid halides preferably contain from 1 to 5 carbon atoms in the carbon chain. Carbon disulfide is preferably used as the solvent although other solvents such as tetrachloroethane are suitable. After acylation is complete the resultant acylated styrene polymer is isolated from the reaction mixture preferably by removal of the solvent, treatment with dilute hydrochloric acid solution followed by washing and drying. The polymer is then thermally decomposed under reduced pressure and the vapors of monomer thus obtained condensed. The quantity and purity of the acylated styrene monomer thus obtained was found to vary with the extent of the evacuation of the distillation apparatus used in cracking the polymer. As shown in the following examples any reduction of pressure in the cracking system below atmospheric pressure increases the yield and purity of the product. For example, under vacuum of 60 mm. of mercury 85% unsaturation is found in the product and at a pressure less than 1 mm. of mercury 97% unsaturation is observed. Other solvents useful in the acylation process are ligroin, nitrobenzene and mixtures of the mentioned solvents. Of course the solvents selected should be less reactive than the styrene polymer.

Example I.—Polyvinylacetophenone

In a 5-liter three-necked flask, fitted with a dropping funnel, a reflux condenser, and a stirrer operating through a water-cooled guide, were placed 268 gm. (2 mols) of Eastman grade aluminum chloride and 1 liter of carbon disulfide. Stirring was begun and 118 gm. (1.5 mols) of practical acetyl chloride were added. While maintaining vigorous stirring, a dope of 104 gm. (1 mol) of polystyrene in 1 liter of carbon disulfide was gradually added over a period of about 20 minutes. The mixture became yellow, a soft bulky precipitate was formed, the carbon disulfide refluxed gently, and hydrogen chloride was evolved. After the addition of polystyrene was complete, the mixture was refluxed by heating it with a bath of warm water for 1¼ hours until the evolution of hydrogen chloride ceased. Stirring was maintained during this period. The reflux condenser was replaced by a tube leading to a distilling condenser, stirring was stopped, and about 60% of the carbon disulfide was distilled off, leaving a yellow damp mass. This was broken up and dropped into vigorously stirred water which contained ice and 200 to 300 cc. of concentrated hydrochloric acid. The material quickly became a white loosely agglomerated mass. After about 20 to 30 minutes of stirring, most of the acidic water was removed and the resin was steamed to rid it of carbon disulfide. This gave a white crisp cake which was broken up mechanically, washed in distilled water, partially dried, doped in acetone and reprecipitated in distilled water. The product, when dried, was white and friable. Analysis showed 80.4% C and 6.7% H. The calculated value for polyvinylacetophenone is 82.15% C and 6.90% H.

Polyvinylacetophenone resin, obtained as described above, is soluble in many organic solvents or combinations of solvents, including acetone, ethylene chloride, acetophenone, dioxane/alcohol 80/20, dioxane/methanol 3/1, and hot dioxane. It is insoluble in benzene or methanol. Its solubility in acetone and its insolubility in benzene serve to differentiate it from the original polystyrene.

The oxime prepared from this polymer was found to contain 8.05% nitrogen, the theoretical value being 8.7% nitrogen. The oxime was soluble in acetone, dioxane, a mixture of equal parts of ethylene dichloride and alcohol, and 5% sodium hydroxide; and was insoluble in alcohol, benzene, or acetophenone.

Example II.—Polyvinylacetophenone

In a three-necked 5-liter flask provided with a stirrer, dropping funnel and reflux condenser, 500 cc. of carbon disulfide were added to 134 gm. (1 mol) of aluminum chloride. Strong stirring was started and maintained throughout the reaction. 56 cc. (92.3 gm. or 0.75 mol) of acetyl bromide were added. A dope of 52 gm. (0.5 mol) of polystyrene in 500 cc. of carbon disulfide was slowly added. Hydrogen bromide was evolved and a dark gelatinous precipitate formed which was fairly well broken up by the stirring. The mixture was refluxed for an additional 45 minutes. After standing at room temperature for 1½ hours, it was poured into 2 gallons of water and well stirred. The carbon disulfide was eliminated by heating in water, and the resin cake was broken up, washed in water until neutral, and dried.

The appearance and solubilities of this polyvinylacetophenone were much like those of the polyvinylacetophenone described in Example I. Analysis showed 81.02% C and 6.57% H.

Example III.—Polyvinylpropiophenone

Polystyrene and propionyl chloride were reacted in the presence of aluminum chloride and carbon disulfide in the manner described above. The reaction appeared to be very similar but, after distilling off most of the carbon disulfide, the mass which was left, moist with carbon disulfide, was harder to break up by the stirring in acid disulfide, was stirred as well as possible, however, and and water. It was stirred as well as possible, however, and steamed, broken up, and washed and dried. The resin obtained was then dispersed in a mixture of pyridine and acetone, then reprecipitated by pouring the dispersion in water. This gave a fluffy white precipitate which was washed and dried.

This product gave somewhat gelatinous dopes in pyridine, ethylene chloride, acetophenone, or ethylene chloride-methanol 4:1. It is partly dissolved in acetone, dioxane, or a mixture of benzene and dioxane. It was only softened by benzene or by acetic acid.

The theoretical composition of polyvinyl propionophenone is 82.4% C and 7.56% H. Analysis of this product showed 80.75% C, 7.44% H, and a small amount of ash.

Example IV.—Polyvinyl acetophenone

The acylated styrene polymer was prepared as follows, the distinguishing feature of the process being the method for isolating the product from the reaction mixture and purifying it.

In an all-glass vessel equipped with efficient stirrer, dropping funnel and reflux condenser was placed 268 g. (2 mols) of finely divided anhydrous aluminum chloride and 1 liter of carbon disulfide. To the constantly stirred suspension was added 118 g. (1½ mols) of acetyl chloride followed by a solution of 104 g. (1 mol) of polystyrene in 1 liter of carbon disulfide. Addition of the polymer solution took about 15 minutes. The reaction mixture became warm and refluxed gently, with copious evolution of hydrogen chloride. No artificial heating or cooling was used. After about ½ hour the evolution of hydrogen chloride had greatly diminished, but stirring was continued another hour. The reaction mixture was then filtered by suction, about 75% of the carbon disulfide used was thus recovered, and the residue on the filter consisted of highly swollen discrete particles. These were dried rapidly in a gentle current of air to give a dusty yellow powder, which was thoroughly agitated with cold 5% hydrochloric acid for about 15 minutes. The polymer was filtered off and washed by stirring in several changes of cold water. On drying at 40–50° C. there was obtained 142–144 g. of a fine, white powder of low ash content. The analysis of this product showed a carbon content of 81.9% and a hydrogen content of 6.9%. The calculated values for pure polyvinyl acetophenone are C=82.2%, H=6.85%.

The above polymer, proven to be polyvinyl-p-acetophenone may be further purified by dissolving it in acetone and pouring the colorless, slightly hazy solution into an excess of agitated water. The white, fibrous precipitate is again washed with water and dried. Found, C=82.3%, H=7.0%.

Example V.—Vinyl acetophenone 30 gm. of polyvinyl acetophenone were thermally decomposed in a distilling apparatus evacuated by a water pump to approximately 60 mm. pressure. A small amount of water was found in the distillate and traces of hydrogen sulfide were noted. The product was dried with sodium sulfate and twice distilled under reduced pressure, using a little hydroquinone to reduce the polymerization. Thus were obtained 8.5 gm. of product which boiled at 130° to 140° at 25 mm.

Example VI.—Vinyl acetophenone 26.6 gm. of polyvinylacetophenone were thermally decomposed by a gentle flame while maintaining a good vacuum by a Hi-Vac pump. A small amount of water was found but was not condensed with the main product. A little hydroquinone was added to the product and the material was distilled in a vacuum produced by a Hi-Vac pump. Under these conditions, it boiled at 60° to 65° C. Thus were obtained 12.5 gm. of slightly yellowish product. The product readily polymerized at room temperature to yield polyvinyl acetophenone.

Example VII.—Vinyl acetophenone

Material prepared by the method of Example IV was heated in a distilling apparatus with the bare flame of a gas burner, the system being evacuated to 1 mm. pressure. 85% yield of a light brown oil obtained which readily crystallized on chilling. This product was redistilled and a very pale yellow oil was collected which distilled at 93–98° C. at 0.5 mm. Hg pressure.

The distillate crystallized and this was recrystallized twice from ligroin (B. P. 60–90° C.) by chilling the solution thoroughly. White crystalline plates were obtained which melted at 34° C. Titration of a sample of this for the double bond by means of bromine indicated a 98.9% content of vinyl acetophenone.

Example VIII.—Vinyl propiophenone

Polyvinyl propiophenone prepared as in Example III was depolymerized and purified by the methods of Example VII to yield a product which proved to be substantially pure vinyl-p-propiophenone.

In order to determine the structure of the monomeric materials prepared in the above examples molecular weight determinations were made, unsaturation was measured by bromination, the unsaturated materials were reduced and oximes and 2,4-dinitrophenyl hydrazones were prepared. The molecular weight of the vinyl acetophenone prepared as in Example VI obtained by depression of the freezing point in benzene was found to be 150.5 compared to the theoretical value of 146 for vinylacetophenone and 148 for ethyl acetophenone.

The unsaturation values given in the above examples were obtained by adding measured quantities of the monomers to a standard solution of bromine in acetic acid. Potassium iodide and water were then added and the iodine liberated by excess bromine was titrated with sodium thiosulfate. The brominated product was purified by recrystallization and found to melt at 75.5° C. and contained 52.46% bromine. The calculated value for vinyl actophenone dibromide is 52.25% bromine.

A quantity of vinyl acetophenone prepared as in Example VI was reduced in alcoholic solution with hydrogen using Adams platinum catalyst to obtain pure p-ethyl acetophenone as shown by the preparation of the corresponding oximes and 2,4-dinitro phenyl hydrazones, which were shown by melting points and mixed melting points to be identical with those made from known p-ethyl acetophenone. The oximes prepared from the vinyl acetophenones of Example V and Example VI melted at 117.5° C.

The polystyrenes indicated above are acylated with the homologous acid chlorides in the manner of the above examples and depolymerization under vacuum yields the corresponding monomeric acylated styrenes.

Copolymers of the acylated styrene compounds of our invention can be synthesized in several ways. One or more of the acylated styrenes prepared as above can be polymerized by well-known methods in a mixture containing other polymerizable compounds containing the —CH=C< or $CH_2$=C< group, for example, any of the non acylated styrenes above mentioned, acrylonitrile, vinyl esters such vinyl acetate, vinyl ethers such as vinyl ethyl ether, vinyl ketones such as vinyl methylketone, acrylic and alkacrylic acids and esters, butadienes, isobutylene, maleic anhydride, vinyl halides, vinylidene chloride, etc. Alternately, the copolymers can be prepared by partial acylation of styrene or of other polymers containing aromatic nuclei, such as the mentioned styrene polymers, using the mentioned acid halides containing from 1 to 5 carbon atoms in the carbon chain. In general the copolymers are obtained by polymerizing mixtures containing from about 5 to 95 mol percent of the acylated styrene and from 95 to 5 mol percent of the other polymerizable compound. If desired the copolymers may also be obtained by polymerization of the mixture containing one or more of the monomeric acylated styrenes prepared by the methods of the Williams U. S. Patent application Serial No. 246,524 filed concurrently herewith; for example o-, m- or p-vinyl acetophenone, and one or more of the other polymerizable compounds indicated above. The following examples illustrate such methods.

*Example IX.—Copolymerization of 4-vinyl acetophenone with styrene*

7.3 grams of 4-vinyl acetophenone, 5.2 g. of styrene and 0.062 g. of benzoyl peroxide were placed in a glass tube, the tube sealed off and placed in a 50° C. constant temperature bath. After 3 days there was obtained a hard, clear and colorless mass.

Five grams of 4-vinyl acetophenone were mixed with 3.6 g. of styrene, 0.043 g. of benzoyl peroxide and 25 cc. of methyl ethyl ketone. This solution was refluxed gently on the steam bath for 24 hours. The viscous, clear colorless solution was poured into an excess of methanol, and the white friable precipitate was leached in fresh methanol, then dried.

Found:
C=84.1%
H=7.2%

Calculated for 1:1 copolymer:
C=86.4%
H=7.2%

*Example X.—Copolymerization of 4-vinyl acetophenone with methyl methacrylate*

Five grams of 4-vinyl acetophenone were mixed with 3.0 g. of methyl methacrylate, 0.040 benzoyl peroxide and 20 g. of dry dioxane. The clear, colorless solution was placed in a glass vial, sealed off and placed in 65° C. bath. In two days a viscous, clear, colorless fluid was formed. This was thinned with acetone, then poured into an excess of stirred methanol. The precipitate, white and fibrous, was leached in fresh methanol. Again the product was precipitated from acetone solution into methanol and dried at 40° C. The product contained 7.8% of methoxyl.

7.3 g. of 4-vinyl acetophenone, 5.0 g. of methyl methacrylate and 0.061 g. of benzoyl peroxide were sealed in a glass tube and the tube was heated in 50° C. bath for 3 days. The product was a hard, clear and colorless mass.

*Example XI.—The copolymerization of vinyl acetophenone with maleic anhydride*

14.6 grams of 4-vinyl acetophenone, 9.8 g. of maleic anhydride, 0.061 g. of benzoyl peroxide and 25 ml. of acetone were refluxed gently in an all-glass apparatus by heating on a steam bath. In 2 hours there was obtained a clear, nearly colorless, very viscous mass. This was thinned by adding 75 cc. of acetone and the solution was poured slowly into an excess of well-stirred benzene. The white, fibrous precipitate was filtered off and leached in fresh benzene. Again the precipitate was filtered off and dried at 40° C. The product (12 g.) was completely soluble in dilute aqueous sodium hydroxide to give a colorless, viscous solution.

Found:
C=70.2%
H=5.5%

Calculated for a 1:1 copolymer:
C=68.8%
H=4.9%

*Example XII.—The copolymerization of 4-vinyl acetophenone with butadiene-1,3*

The following ingredients were placed in a pressure vessel and the closed vessel tumbled in a water bath at 40° C. for 40 hours:

2.5 cc. of a 3% aqueous solution of potassium persulfate
50 cc. of a 2.5% aqueous solution of sodium lauryl sulfate
6.0 g. of 4-vinyl acetophenone
10.0 g. of butadiene 1,3
0.12 g. of dodecyl mercaptan When the vessel was opened, there was little internal pressure. The latex was poured into brine, and the white curdy precipitate was washed. The product, when dry, was a tough rubbery polymer.

*Example XIII.—Copolymerization of 4-vinyl acetophenone with acrylic acid*

7.3 grams of 4-vinyl acetophenone, 3.6 g. of acrylic acid and 0.055 g. of benzoyl peroxide were sealed together in a glass tube and placed in 50° C. bath for 3 days at the end of which time a clear and colorless polymer had formed.

*Example XIV.—The preparation of a partially acetylated polystyrene*

52 grams of polystyrene were dissolved in 500 cc. of carbon disulfide. This was added to a suspension of 62 g. of anhydrous aluminum chloride in 500 cc. of carbon disulfide contained in a 3-liter glass flask fitted with an efficient glass stirrer, condenser and dropping funnel. While the mixture was being vigorously stirred, a mixture of 30 g. of acetyl chloride and 100 cc. of carbon disulfide were added dropwise. During this addition the reaction mixture soon became thick and gelatinous and another 500 cc. of carbon disulfide were added. Stirring was continued and more of the acid chloride mixture was cautiously added and soon the gel structure collapsed and a suspension of highly swollen polymer particles suspended in the carbon disulfide was obtained. The remainder of the acid chloride could now be added at a faster rate. Copious evolution of hydrogen chloride was observed and stirring was continued for another hour after the addition of the acid chloride was complete. The mixture was then filtered and dried in a current of air. The crumbly product was broken up fine and added to a well-stirred ice-cold 5% hydrochloric acid solution. The white suspension was filtered off and washed with water and dried. The white, dry polymer was dissolved in dioxane, the solution filtered and the filtrate was poured slowly into an excess of agitated methanol. The white, fibrous precipitate was washed thoroughly in water, then dried at 40° C.

*Example XV.—Preparation of a copolymer of vinyl acetophenone and isobutylene*

160 grams of a copolymer of styrene and isobutylene (consisting of essentially equimolecular proportions of the two monomers) were dissolved in 1 liter of carbon disulfide. In a 5-liter flask fitted with an efficient glass stirrer, condenser and dropping funnel was suspended 268 g. of anhydrous aluminum chloride in 1 liter of carbon disulfide. To this was then added 118 g. of acetyl chloride. While this suspension was well stirred, the solution of the polymer was added over a period of 10 minutes. Copious evolution of hydrogen chloride took place and a loose bulky precipitate formed. After the addition of the polymer was complete, stirring was continued for another hour. The product was filtered and the crumbly polymer dried in a current of air. The dried polymer was crushed up fine and stirred up with an excess of ice-cold 5% hydrochloric acid solution. The polymer was filtered off by suction and washed thoroughly with water to remove excess acid. Dried at 40° C. Yield about 180 grams.

*Example XVI*

The ortho, meta, and para vinyl acetophenones prepared by the methods of the Williams invention referred to above were copolymerized as in the above examples with styrene, maleic anhydride, butadiene, acrylic acid, and isobutylene and the polymerizations were found to proceed in the same manner as when the polymerizations were carried out with the vinyl acetophenone as in Examples V to VII.

*Example XVII.—Use of chloroacetyl chloride*

In a flask provided with a stirrer and a reflux condenser, 16.9 g. (0.15 mole) of choroacetyl chloride was added to a solution of 10.4 g. (0.1 mole) polystyrene in 100 cc. of carbon disulfide. With stirring, 26.7 g. (0.2 mole) of aluminum chloride was added. The mixture was stirred at room temperature for one-half hour, then 50 cc. more carbon disulfide was added and it was stirred for one and a half hours while warming with a 40° C. water bath. Most of the carbon disulfide was decanted, and the residue was decomposed by treatment first with cold water then with hot. The solid was then filtered off and dried.

Calculated for polyvinyl w-chloroacetophenone, $C_{10}H_9OCl$, 19.65% Cl.

Found: 16.91%.

*Example XVIII.—Use of bromoacetyl bromide*

In a flask provided with a stirrer, reflux condenser, and dropping funnel, 53.4 g. (0.4 mole) of aluminum chloride was added to 200 cc. of carbon disulfide. While stirring, 60.6 g. (0.3 mole) of bromoacetyl bromide was added. With continuous stirring, over a period of about ten minutes, a solution of 20.8 g. (0.2 mole) of polystyrene in 200 cc. of carbon disulfide was added. The mixture darkened, became lumpy, and evolved hydrogen bromide. Stirring without heating was continued for 1.5 hours, then the mixture was stirred while heated to a gentle reflux for 0.5 hour. The mass was poured into water and stirred well, finally stirring with hot water to evaporate the carbon disulfide. The solid was ground in water, further washed with water, and dried at room temperature.

Calculated for polyvinyl w-bromoacetophenone, $C_{10}H_9Br$, 35.53% Br.

Found: 36.03%.

*Example XIX.—Use of acetic anhydride*

In a flask provided with a stirrer, reflux condenser, and dropping funnel, 286 g. (2.0 moles) of aluminum chloride was added to one liter of carbon disulfide. A solution of 104 g. (1.0 mole) of polystyrene in one liter of carbon disulfide was added, and with continuous stirring, 153 g. (1.5 moles) of acetic anhydride was added over a period of 20 minutes. The carbon disulfide refluxed. After the addition was complete, the reaction mixture was heated to refluxing with stirring, for 1.5 hours. Most of the carbon disulfide was then distilled out, while still stirring. The damp mass remaining was stirred thoroughly with cold water containing hydrochloric acid, then it was steamed with stirring, washed free of acid in water, and dried at room temperature. The product was a nearly white material similar to that made using acetyl chloride.

*Example XX.—Preparation of polyvinyl benzophenone*

In a flask provided with a stirrer, reflux condenser, and dropping funnel were placed 270 g. of aluminum chloride and one liter of carbon disulfide. To this was added, with stirring, 210 g. (1.5 moles) of benzoyl chloride. The mixture became dark. A solution of 104 g. of polystyrene in one liter of carbon disulfide was slowly added. The precipitate which formed was broken up and the mixture was allowed to stand at room temperature for 1.5 hours, with occasional agitation. The solid was filtered from the solution, added to water, and steamed thoroughly. It was then extracted for 18 hours with hot methanol. The product was nearly white.

A sample was heated over a free flame in a distillation apparatus evacuated to 0.2 to 0.3 mm. The distillate was an oil. Titration with bromine showed unsaturation corresponding to vinyl benzophenone. A sample of this oil, when heated with benzoyl peroxide, polymerized to a clear hard polymer.

*Example XXI.—Polyvinyl 2,5-dichloroacetophenone*

In a flask provided with a stirrer, reflux condenser, and dropping funnel were placed 250 cc. of carbon disulfide, 28 cc. (0.4 mole) of acetyl chloride, and 67 g. (0.5 mole) of aluminum chloride. With stirring, a solution of 43 g. (0.25 mole) of poly 2,5-dichlorostyrene in 250 cc. of carbon disulfide was added over a period of 15 minutes. Gentle evolution of hydrogen chloride took place. The mixture was stirred, without heating, for 21 hours. The solid material was filtered from most of the carbon disulfide and dried at room temperature. It was treated with aqueous hydrochloric acid, then washed with water until neutral, and dried at room temperature. The product was purified by dissolving it in methyl ethyl ketone and precipitating in water, followed by further washing and drying.

Calculated for polyvinyl 2,5-dichloroacetophenone, 55.8% C; 3.7% H; 33.0% Cl.

Found: 54.8% C; 3.9% H; 37.5% Cl.

*Example XXII.—Simultaneous acylation and polymerization*

In a flask provided with a reflux condenser, 16.9 g. (0.15 mole) of chloroacetyl chloride was mixed with 26.7 g. of aluminum chloride and 150 cc. of carbon disulfide. A solution of 10.4 g. (0.1 mole) of monomeric styrene in 25 cc. of carbon disulfide was added in several portions. Reaction took place with refluxing of the carbon disulfide. The mixture was shaken frequently during this addition and during an additional half hour during which time it was kept heated to refluxing by a hot water bath. Most of the carbon disulfide was removed under reduced pressure while heating on a steam bath. The residue was then thoroughly agitated with water, washed in water, and dried at room temperature.

Calculated for poly w-chlorovinylacetophenone: 19.64% Cl.

Found: 18.08% Cl.

The product appeared to be a polymer of rather low molecular weight. It did not absorb bromine, or react with potassium permanganate in acetone. It was soluble in acetone, but not in alcohol, dioxane, benzene, or acetic acid. It reacted with hot pyridine, with liberation of chloride ion.

The acylated polymers of Examples XVII to XXII were pyrolyzed to yield the corresponding monomers which readily polymerized with other polymerizable compounds such as styrene, vinyl ethyl ketone, etc., above-mentioned.

The acylated styrenes and copolymers thereof are particularly useful in the preparation of light-sensitive vinyl benzalacetophenone polymers such as disclosed and claimed in the Unruh et al. U. S. Patent applications Serial Nos. 246,515–8 filed concurrently herewith which light-sensitive polymers are particularly useful for the preparation of photomechanical resist images and for purposes of color photography.

By the term "a vinyl acetophenone" we mean to include any of the isomeric acetylated vinyl benzenes the aryl nuclei of which are substituted or not with groups other than acetyl and vinyl. By "a styrene homopolymer" is meant a polymer of vinyl benzene the aryl nuclei of which are substituted or not with groups other than vinyl groups. By "vinyl acetophenone" is meant any of the isomeric acetylated vinyl benzenes, the benzene nucleus of which is free of substituents other than acetyl and vinyl.

What we claim is:

A 4-vinylacetophenone-maleic anhydride copolymer.

(References on following page)

References Cited in the file of this patent

UNITED STATES PATENTS

| | | |
|---|---|---|
| 2,197,709 | Ralston et al. | Apr. 16, 1940 |
| 2,341,454 | Lieber | Feb. 8, 1944 |
| 2,374,589 | Dreisbach | Apr. 24, 1945 |
| 2,500,082 | Lieber et al. | Mar. 7, 1950 |
| 2,566,302 | Allen et al. | Sept. 4, 1951 |

OTHER REFERENCES

Bachman et al., J. Organic Chem. vol. 12, 1947, pages 108, 119 and 120.